(12) United States Patent
Alexis

(10) Patent No.: US 7,007,195 B2
(45) Date of Patent: Feb. 28, 2006

(54) BIOS SHADOWED SMALL-PRINT HARD DISK DRIVE AS ROBUST, ALWAYS ON, BACKUP FOR HARD DISK IMAGE & SOFTWARE FAILURE

(75) Inventor: Alan Previn Alexis, Kajang (MY)

(73) Assignee: Intel Corporation, Santa Clara, CA (US)

(*) Notice: Subject to any disclaimer, the term of this patent is extended or adjusted under 35 U.S.C. 154(b) by 477 days.

(21) Appl. No.: 10/107,379

(22) Filed: Mar. 27, 2002

(65) Prior Publication Data

US 2003/0188223 A1 Oct. 2, 2003

(51) Int. Cl.
*G06F 11/00* (2006.01)

(52) U.S. Cl. .............................. 714/6; 714/7
(58) Field of Classification Search .............. 714/6, 714/7
See application file for complete search history.

(56) References Cited

U.S. PATENT DOCUMENTS 6,185,696 B1 * 2/2001 Noll .............................. 714/6

2003/0028800 A1 * 2/2003 Dayan et al. ................ 713/200

OTHER PUBLICATIONS

"Bootit Next Generation" TeraByte Unlimited, 2003.*
"Bootit Next Generation: General Questions" TeraByte Unlimited 2004.*
NT Compatible, www.ntcompatible.com, messageboard thread, dated Mar. 4, 2002.*

* cited by examiner

Primary Examiner—Bryce P. Bonzo
(74) Attorney, Agent, or Firm—Kevin A. Reif

(57) ABSTRACT

A storage backup and filter module is utilized to restore a storage device to enable the storage device to become bootable. The storage backup and filter module makes a shadow storage device invisible to a Basic Input/Output system (BIOS) and an operating system. The storage backup and filter module stores a storage device image from the storage device to the shadow storage device. The storage backup and filter module restores at least one section of the storage device image from the shadow storage device to the storage device.

27 Claims, 4 Drawing Sheets

BIOS SHADOWED SMALL-PRINT HARD DISK DRIVE AS ROBUST, ALWAYS ON, BACKUP FOR HARD DISK IMAGE & SOFTWARE FAILURE

BACKGROUND OF THE INVENTION

1. Field of the Invention

The present invention generally relates to backup of a storage device. More particularly, the present invention relates to the utilization of a storage device that is invisible to the Basic Input Output System (BIOS) and the operating system as a backup to the storage device.

2. Discussion of the Related Art

Currently, the computer marketplace is very competitive and computer manufacturers are striving to provide value-added benefits to differentiate themselves from competitors. Computer purchasers are demanding better performance, quality, and reliability along with after-sales technical support. The breakdown of a computing device has increasingly adverse effects to organizations. Organizations and individuals are placing a great deal of emphasis on attempting to reduce the repair time of a computer.

In a standard computing device, a storage device, a processor, a random access memory (RAM), and an operating system are the central components of the computing device. The operating system provides a set of services for the applications running on the computing device and also provides the basic user interface. The operating system is initially stored on the storage device and is loaded during initialization of the computer by the basic input output system (BIOS).

When a computing device is turned on, the processor is directed to a specific location in the RAM which contains an instruction to go to the BIOS. The processor begins executing the BIOS instructions. The first portion of the BIOS booting sequence is the Power-On Self Test (POST). During this process, the BIOS instructions initialize the processor, basic hardware, and the video adapter. The next BIOS instructions poll the connected devices within the computing device. Each hardware device within the computing device has a default address it is associated with. The BIOS steps through each of the possible addresses to determine if any hardware device is existing on that address. If the BIOS determines a device is located at an address, the BIOS initializes the device and also may assign interrupt numbers, memory space for BIOS vector calls and new memory addresses if required. After the BIOS performs these tasks for each installed hardware device, all of the hardware devices are initialized, and the BIOS vector calls in RAM have been updated with information to talk to the hardware.

After successful completion of the POST, the BIOS activates the computing device's storage devices to find the first piece of the operating system, e.g., the bootstrap loader, which is located on one of the storage devices. If the storage device does not have a bootstrap loader, i.e., it is not bootable, it may not be used by the BIOS to load the operating system into memory. The bootstrap loader loads the operating system into memory and allows the operating system to initialize. The bootstrap loader sets up the small driver programs that interface with and control the various hardware subsystems of the computing device. It also sets up the divisions of memory that hold the operating system, user information and applications. Then, it turns control of the computing device over to the operating system.

The cause of computing device breakdowns range from software failure to physical storage device crashes to RAM failures. The largest root cause of computing device breakdowns is software failure. Specifically, corruption of the operating system is a leading root cause of computing device failure. In the worst case, corruption of the operating system may render a storage device inoperable by removing system files, which are necessary for the booting of the computing device via the bootstrap loader.

Corruption of the operating system may occur when end users try to modify system files and accidentally delete operating system kernel related drivers and modules. Additionally, operating system corruption may occur when end users install applications or hardware drivers that do not work with the operating system and these drivers or the hardware associated with them damage the operating system copy. Finally, exposure to computer viruses may cause the operating system extensive damage and may even cause logical errors on the storage device of the computing device.

Accordingly, in order to meet the availability demands of the current computer purchaser and minimize the impact of corruption of the operating system, a need exists for a copy of the storage device's image to be stored in order to restore an operating system to the damaged or inoperable storage device.

DETAILED DESCRIPTION

Figure 1:
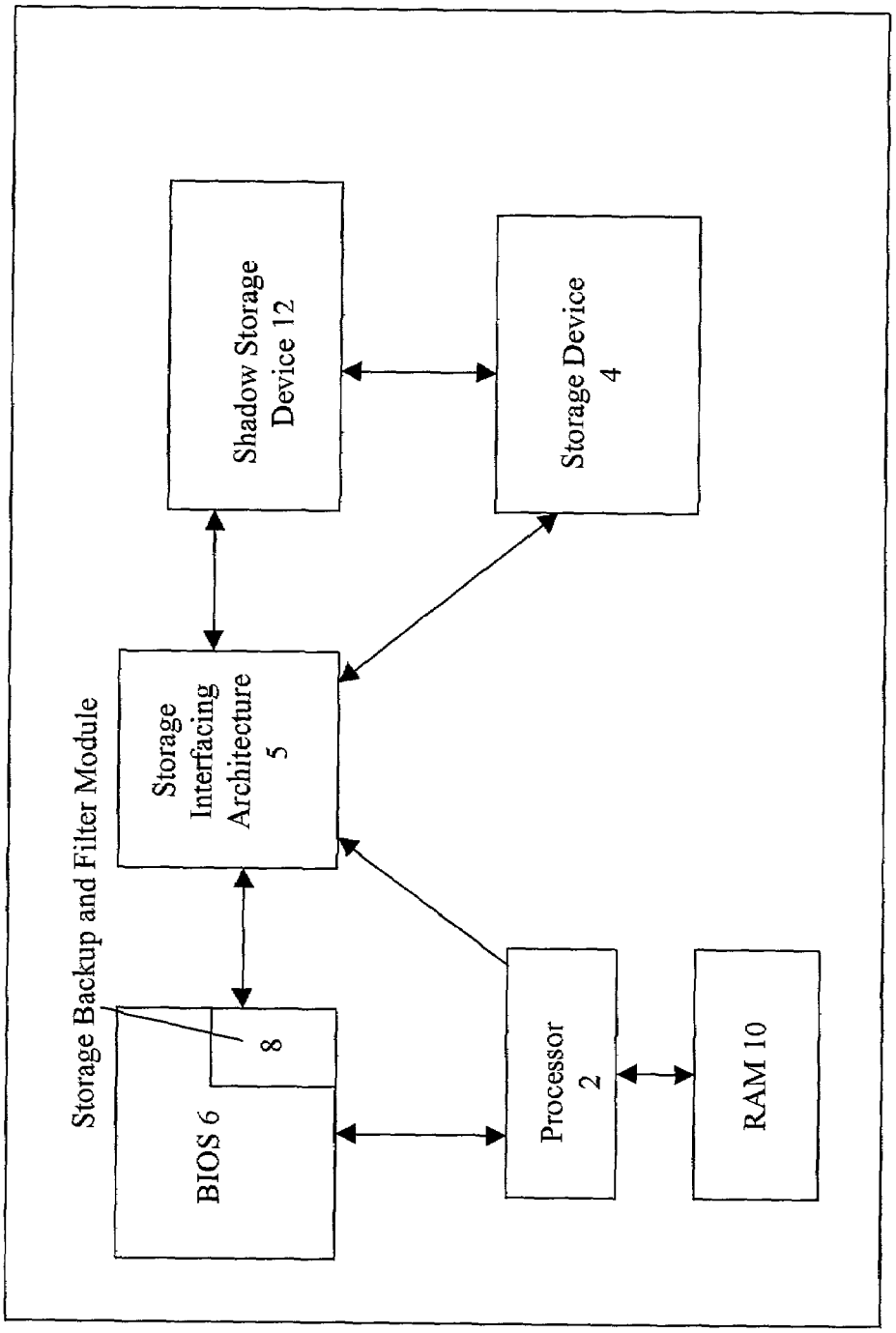
FIG. 1 illustrates a computing device with a storage backup and filter module according to an embodiment of the present invention.

FIG. 1 illustrates a computing device with a storage backup and filter module according to an embodiment of the present invention. The computing device 1 may include a processor 2, a storage device 4, a storage interfacing architecture 5, a basic input-output system (BIOS) 6, a storage backup and filter module 8, and a shadow storage device 12. The computing device 1 may also include a random access memory (RAM) 10. The storage device 4 may contain the bootstrap loader and the operating system software.

The storage backup and filer module 8 may be utilized to restore either the bootstrap loader, specific sections of the operation system, or the entire operating system stored on the shadow storage device 12 to the storage device 4, when the storage device 4 of the computing device 1 has failed. The failure may be because the bootstrap loader has been corrupted. Alernatively, the failure may be that operating system system files or the operating system driver files are corrupted. Once the files are restored by the storage backup and filter module 8, the storage device 4 is operational and may be utilized by the computing device 1. By having a storage backup and filter module 8 resident on the computing device 1, time to repair may be reduced and a competitive advantage may be gained.

The computing device 1 may be a personal computer. The computing device 1 may also be, for example, an industrial personal computer, a network attached storage machine, a television set-top box, or other such devices having a shadow storage device 12. In an alternative embodiment of the invention, the computing device 1 may be a communications network router or a communications network server. In an embodiment of the present invention, the computing device 1 a) may have a storage interfacing architecture that allows more than one storage device on the system, b) may not require dependence between the possible more than one storage devices on the system, and c) has a BIOS-like firmware that controls the initialization of the interfaces of the possible more than one storage devices on the system.

The shadow storage device 12 may be located internal to the computing device 1. Alternatively, the shadow storage device 12 may be located external to the computing device 1 as long as the computing device BIOS 6 may still interact with the shadow storage device 12. The shadow storage device 12 may be "invisible," e.g., unrecognizable by the computing device BIOS 6. The storage backup and filter module 8 may prevent the BIOS and the operating system from recognizing and initializing the shadow storage device. In other words, the computing device BIOS 6 may not try to access the shadow storage device 12 during normal operations, e.g., bootup or read/write operations to the storage device 4.

The shadow storage device 12 may be a hard disk drive, i.e., fixed disk drive. Alternatively, the shadow storage device 12 may be a read-only memory (ROM). In other embodiments of the present invention, the shadow storage device 12 may be a Disk-on-Chip or a removable disk drive. The storage device 4 may be a fixed disk drive. Alternatively, the storage device 4 may be a ROM. In other embodiments of the invention, the storage device 4 may be a Disk-On-Chip, a removable disk drive or any other suitable data storage structure.

Figure 2:
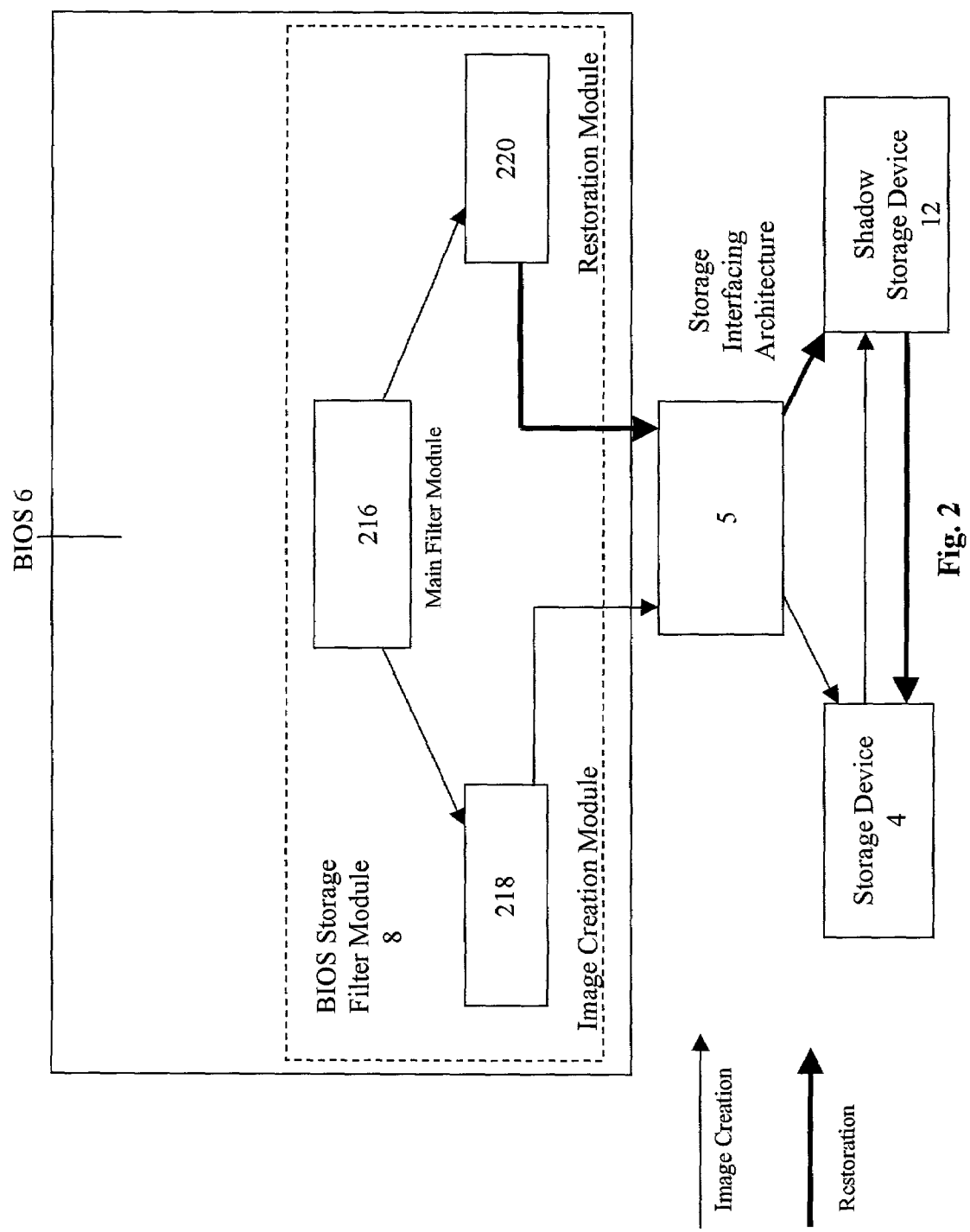
FIG. 2 illustrates a storage backup and filter module according to an embodiment of the present invention.

FIG. 2 illustrates a storage backup and filter module according to an embodiment of the present invention. The storage backup and filter module 8 may be utilized to restore operational files to a storage device 4 in the event that operational files are damaged or erased on the storage device 4. The storage backup and filter module 8 may logically be part of the BIOS 6. In one embodiment of the present invention, the storage backup and filter module 8 may be located in the same physical device as the BIOS 6. In an alternative embodiment of the present invention, the storage backup and filter module 8 may be located in a different physical device from the BIOS 6.

The storage backup and filter module 8 may include a main filter module 216 to make the shadow storage device 12 invisible, an image creation module 218, and a restoration module 220. The main filter module 216, the image creation module 218, and the restoration module 220 may be implemented in software. Alternatively, the main filter module 216, the image creation module 218, and the restoration module 220 may be implemented in one of a Flash read-only memory (ROM), an application specific integrated circuit (ASIC), an electronically-erasable programmable read-only memory (EEPROM), or any other suitable element.

The main filter module 216 may make the shadow storage device 14 invisible to the BIOS 6 and the operating system. In other words, during the initialization of the computing device 1, the main filter module 216 may prevent the BIOS from initializing the shadow storage device, and from assigning interrupts and memory space for BIOS vector calls. In one embodiment of the invention, the main filter module 216 may include an interface blocking module to logically block out one of the storage interfacing architecture 5 connections to make the shadow storage device 14 invisible to the computing device 1, and to logically reserve the one of the plurality of storage interfacing architecture 5 connections that is blocked from detection for the shadow storage device 14.

In such an embodiment of the invention, the storage interfacing architecture 5 connections may be Integrated Device Electronics (IDE) connections. In an alternative embodiment of the invention, the storage interfacing architecture 5 connections may be small computer system interface (SCSI) connections. In the embodiment where the storage interfacing architecture 5 connection is an IDE connection, the secondary slave IDE connection may be blocked from detection by the operating system and the operating system may only see three IDE connections on the computing device 1. In this embodiment, the blocked IDE connection may be reserved for the shadow storage device 12 and may not be accessible by the user through the operating system.

The main filter module 216 may also include an authentication module to provide authentication to users to utilize the image creation module 218 and the restoration module 220. In one embodiment of the invention, the authentication module may authenticate a user to utilize, through a BIOS setup program, the image creation module 218 and the restoration module 220. In another embodiment of the present invention, the authentication module may authenticate a user to utilize the image creation module 218 and the restoration module 220 via another software program.

The authentication module may allow only certain individuals access to the shadow storage device 12. The authentication module may allow only an original equipment manufacturer (OEM) or an end-user to enter passwords and user-IDs to gain access to the shadow storage device 12. Illustratively, individuals representing the original equipment manufacturer (OEM) of the computing device 1 (see FIG. 1) may be allowed to access the shadow storage device 12 upon input of a user-ID and a password. Individuals representing the OEM may access the shadow storage device 12 in order to make repairs to the system or to restore the system. Illustratively, the individuals representing the OEM may access the shadow storage device 12 utilizing an input device, such as a keyboard or mouse, or by remotely communicating with the computing device 1 via a communications network, utilizing devices such as a modem or local area network controller. Alternatively, an end user may be provided with a second user-ID and password in order to be allowed to access the shadow storage device 12.

The image creation module 218 may store a storage device image from the storage device 4 (see FIG. 1) to the shadow storage device 12. The image creation module 218 may include at least one of a compression module and a storage archiving module. In one embodiment of the present invention, the storage device image may be copied from the storage device 4 to the shadow storage device 14 using only the storage archiving module. In another embodiment of the present invention, the storage device image may be compressed by the compression module to create a compressed storage device image, and the compressed storage device image may be stored on the shadow storage device 14 using the storage archiving module. The image creation module 218 may utilize the compression module because the compressed storage device image may have a small file size. The smaller file size of the compressed storage device image may reduce the overall storage requirements of the shadow storage device 12.

The storage device image may include a plurality of software modules. Thus, the image creation module 218 may store only one of the plurality of software modules, a few of the software modules, or all of the software modules. Illustratively, in a personal computer, the storage device image may include software modules such as a working bootstrap loader, operating system files and folders, and operating system driver files. In one embodiment of the present invention where both the compression module and the storage archiving module are utilized, the image creation module 218 may only compress and store the working bootstrap loader. In another embodiment, the image creation module may only compress and store the operating system driver files. In even another embodiment of the present invention, the image creation module 218 may use the compression module to compress all of the plurality of software modules and use the storage archiving module to physically store all of the plurality of software modules into the shadow storage device 12.

In one embodiment of the present invention, the restoration module 220 may restore at least one section of the storage device image from the shadow storage device 214 to the storage device 4 (see FIG. 1). The restoration module may include at least one of the decompression module and the storage retrieval module. In one embodiment of the present invention where the compression module of the image creation module 218 created a compressed storage device image, the restoration module 220 may utilize the decompression module to decompress the at least one section of the compressed storage device image, and to return it to a format that the storage device 4 is able to understand. The restoration module 220 may utilize the storage retrieval module to take the at least one section of the storage device image which was decompressed and physically restore it to the storage device 4. The at least one section of the decompressed storage device image may be identical in contents to the original storage device image, i.e., the storage device image.

In an alternative embodiment of the present invention where only the storage archiving module was utilized to store a copy of the storage device image on the shadow storage device 12, the restoration module 220 may only copy, and not decompress, the at least one section of the storage device image to the storage device 4 to restore operating capabilities of the storage device 4. In this embodiment of the present invention, the storage archiving module may copy at least one section of the storage device image from the shadow storage device 12 and store it on the storage device 4.

The storage device image may include a plurality of software modules. Thus, the restoration module 220 may restore only at least one section of the storage device image, a few sections of the storage device image, or all of the sections of the storage device image. Illustratively, in a personal computer, the storage device image may include a working bootstrap loader, operating system files and folders, and operating system driver files. In one embodiment of the present invention where the compression module created a compressed storage device image and the storage archiving module stored the compressed storage device image on the shadow storage device 12, the restoration module 220 may only decompress and restore the operating system files and folders. In an alternative embodiment, the restoration module 220 may only decompress and restore the operating system driver files. In even another alternative embodiment of the present invention, the restoration module 220 may use the decompression module to decompress all of the sections of the compressed storage device image, and may use the storage retrieval module to restore all of the sections of the storage device image that were decompressed onto the storage device 4.

Figure 3:
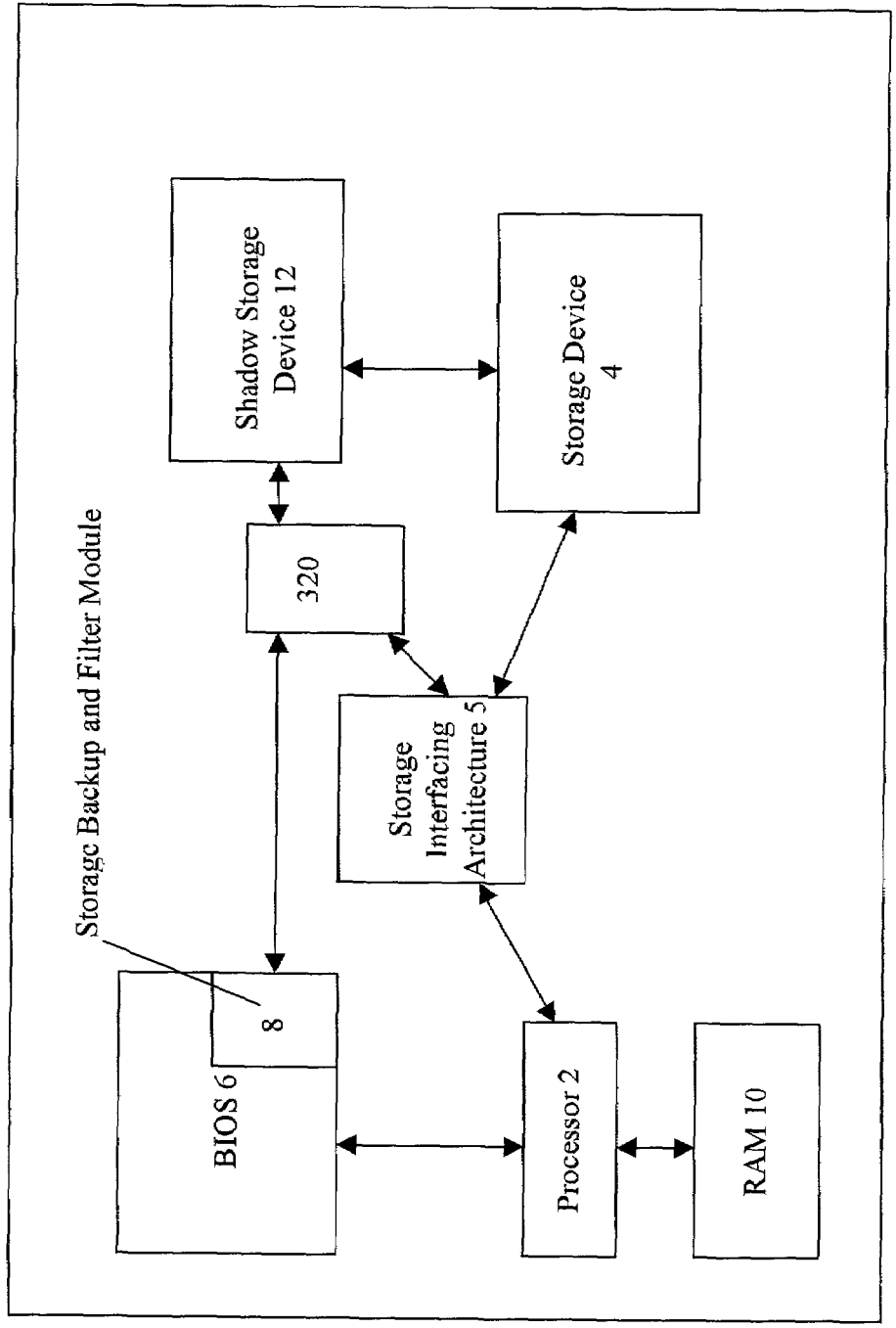
FIG. 3 illustrates a backup storage system device in an environment where an operating system software supports bypassing BIOS vector calls and making direct connections to a storage device through a storage interfacing architecture according to an embodiment of the present invention.

FIG. 3 illustrates a backup storage system device in an environment where an operating system software supports bypassing BIOS vector calls and making direct connections to a storage device through a storage interfacing architecture according to an embodiment of the present invention. After the initialization of all of the located hardware devices by BIOS when a computer is turned on, these operating systems also poll devices and initialize any devices that the operating system may find during the polling. In such an embodiment, the main filter module 216 of the storage backup and filter module 8 may not be able to block detection of the shadow storage device 12 because the operating system is not utilizing the BIOS 6 when it is performing the polling. In such an embodiment, additional hardware modifications may need to be implemented because there is a risk that the operating system may be able to detect the shadow storage device 12. Illustratively, the Linux operating system makes direct connections to storage devices located in computing devices through the storage interfacing architecture 5 and polls the hardware devices independently of the BIOS 6.

In the embodiment of the present invention illustrated in FIG. 3, the computing device 1 may further include a blocking device 320. The blocking device 320 may physically block out electrical signals from one of the storage interfacing architecture 5 connections to the shadow storage device 12. Illustratively, the storage interfacing architecture 5 connection may be an IDE connection. In this embodiment of the present invention, the blocking device 320 may block out electrical signals from the secondary slave IDE connection during normal operation of the computing device 1 (see FIG. 1). This blocking may keep the operating system from detecting the shadow storage device 12. In one embodiment of the present invention, the Linux operating system cannot communicate with the shadow storage device 12 because the blocking device 320 has blocked the electrical connection to the shadow storage device.

To allow the shadow storage device 12 to be accessed within the BIOS setup program after proper authentication, the blocking device 320 may enable the blocked electrical signals if a user is within the BIOS setup program. In other words, in the embodiment of the present invention discussed above, the blocking device 320 may enable the secondary slave IDE connection only when a user is within the BIOS setup program. In this embodiment, the user may be able to utilize the compression module, the storage archiving module, the decompression module, and the storage retrieval module if the user is in the BIOS setup program. In an embodiment of the present invention illustrated in FIG. 3, the storage backup and filter module 8 communicates directly with the blocking device 320, which allows signals from the storage backup and filter module 8 to go to the shadow storage device 12.

Figure 4:
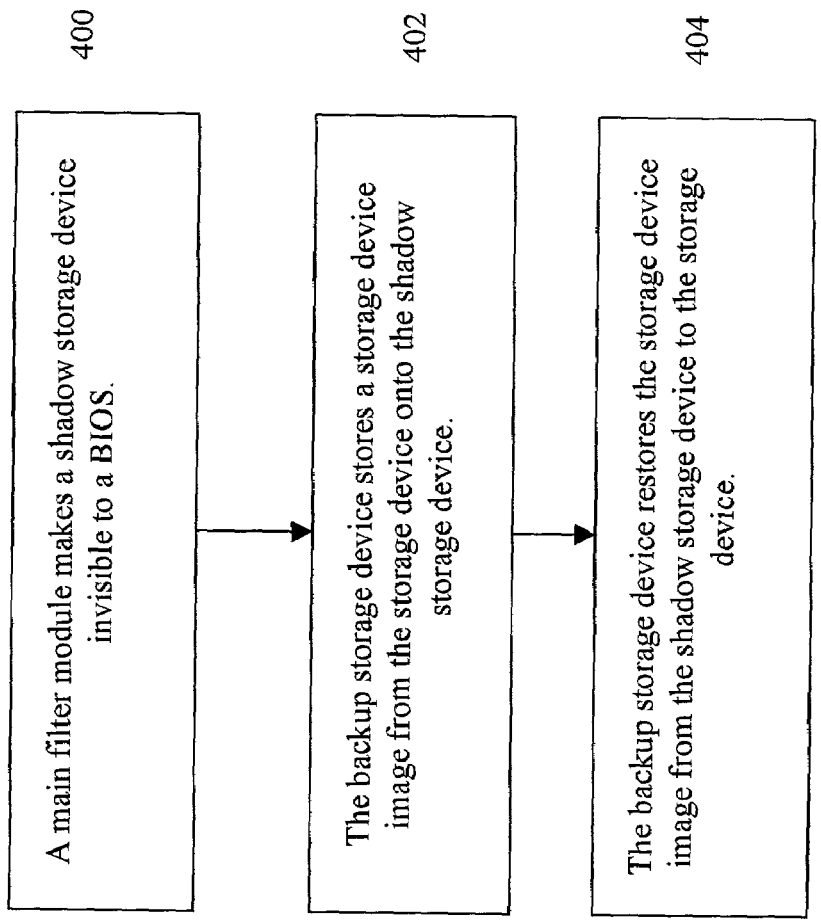
FIG. 4 illustrates a flowchart for a backup storage device system according to an embodiment of the present invention.

FIG. 4 illustrates a flowchart for a backup storage device system according to an embodiment of the present invention. A storage backup and filter module 8 makes 400 a shadow storage device 12 invisible to a BIOS. In one embodiment of the invention, the storage backup and filter module 8 stores 402 a storage device image from the storage device 4 onto the shadow storage device 12. The storage backup and filter module 8 restores 404 the storage device image from the shadow storage device 12 to the storage device 4.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are intended to be embraced therein.

What is claimed is:

1. A storage backup and filter module to allow for backup of a storage device onto a shadow storage device, comprising:
   a main filter module to make the shadow storage device invisible to BIOS;
   an image creation module to store a storage device image from the storage device onto the shadow storage device; and
   a restoration module to restore at least one section of the storage device image from the shadow storage device to the storage device to restore operating capabilities of the storage device,
   wherein the storage device image includes a working bootstrap loader, operating system files and folders, and operating system driver files.

2. The storage backup and filter module of claim 1, wherein the main filter module further includes an authentication module to provide authentication to utilize the image creation module and the restoration module.

3. The storage backup and filter module of claim 1, wherein the image creation module includes at least one of a compression module and a storage archiving module.

4. The storage backup and filter module of claim 1, wherein the storage device image further includes user-installed software and configuration files.

5. The storage backup and filter module of claim 4, wherein the storage retrieval module only restores the working bootstrap loader.

6. The storage backup and filter module of claim 4, wherein the storage retrieval module only restores the operating systems files and folders.

7. The storage backup and filter module of claim 4, wherein the storage retrieval module only restores the operating system driver files.

8. The storage backup and filter module of claim 1, wherein the image creation module utilizes the compression module to create a compressed storage device image and the storage archiving module to copy the compressed storage device image onto the shadow storage device.

9. The storage backup and filter module of claim 8, wherein the restoration module utilizes the decompression module to decompress the compressed storage device image and the storage retrieval module to restore the storage device image onto the storage device.

10. A storage backup and filter module to allow for backup of a storage device onto a shadow storage device, comprising:
    a main filter module to make the shadow storage device invisible to BIOS;
    an image creation module to store a storage device image from the storage device onto the shadow storage device; and
    a restoration module to restore at least one section of the storage device image from the shadow storage device to the storage device to restore operating capabilities of the storage device,
    wherein the storage device image includes a working bootstrap loader, operating system files and folders, and operating system driver files,
    wherein the image creation module includes at least one of a compression module and a storage archiving module,
    wherein the restoration module includes at least one of a decompression module and a storage retrieval module.

11. A storage backup and filter module to allow for backup of a storage device onto a shadow storage device, comprising:
    a main filter module to make the shadow storage device invisible to BIOS;
    an image creation module to store a storage device image from the storage device onto the shadow storage device; and
    a restoration module to restore at least one section of the storage device image from the shadow storage device to the storage device to restore operating capabilities of the storage device,
    wherein the main filter module includes an interface blocking module to block out detection of one of a plurality of storage interfacing architecture connections to make the shadow storage device invisible to the computing device, and to reserve the one of the plurality of storage interfacing connections that is blocked from detection for the shadow storage device.

12. A computing device, comprising
    a processor;
    a storage device;
    a storage interfacing architecture;
    a basic-input output system (BIOS);
    a shadow storage device invisible to the BIOS; and
    a storage backup and filter module, including
    a main filter module to make the shadow storage device invisible to the BIOS,
    an image creation module to store a storage device image from the storage device onto the shadow storage device,
    a restoration module to copy at least one section of the storage device image from the shadow storage device to the storage device to restore operating capabilities of the storage device; and
    a blocking device to disable signals from the storage interfacing architecture to the shadow storage device when the computing device operating system independently determines what devices are located within the computing device.

13. The computing device of claim 12, wherein the computing device is selected from the group consisting of a personal computer, an industrial personal computer, a network attached storage machine, an Internet router, an Internet server, and a set-top box.

14. The computing device of claim 12, wherein a small computer system interface (SCSI) is the storage interfacing architecture between the processor and the storage device.

15. The computing-device of claim 12, wherein an Integrated Device Electronics (IDE) interface is a storage interfacing architecture between the processor and the storage device.

16. The computing device of claim 12, wherein the storage device is a hard disk drive.

17. The computing device of claim 12, wherein the storage device is a Flash read-only memory (ROM).

18. The computing device of claim 12, wherein the storage device is a Disk-on-Chip.

19. A method to restore a storage device to enable the storage device to become bootable, comprising:

making a shadow storage device invisible to a BIOS;

storing a storage device image from the storage device to the shadow storage device; and restoring at least one section of the storage device image from the shadow storage device to the storage device to restore operating capabilities of the storage device, wherein storing the storage device image includes utilizing at least one of a compression module and a storage archiving module, wherein restoring the at least one section of the storage device image includes utilizing at least one of a decompression module and a storage retrieval module, wherein the storage device image includes a working bootstrap loader, operating system files and folders, and operating system driver files.

20. The method of claim 19, wherein the storage device image further includes user-installed software and configuration files.

21. A method to restore a storage device to enable the storage device to become bootable, comprising:

making a shadow storage device invisible to a BIOS:

storing a storage device image from the storage device to the shadow storage device; and restoring at least one section of the storage device image from the shadow storage device to the storage device to restore operating capabilities of the storage device, wherein storing the storage device image includes utilizing at least one of a compression module and a storage archiving module, wherein restoring the at least one section of the storage device image includes utilizing at least one of a decompression module and a storage retrieval module, wherein storing the storage device image includes creating a compressed storage device image and copying the compressed storage device image to the shadow storage device.

22. The method of claim 21, wherein restoring the compressed storage device image includes decompressing and restoring at least one section of the compressed storage device image.

23. A method to restore a storage device to enable the storage device to become bootable, comprising:

making a shadow storage device invisible to a BIOS;

storing a storage device image from the storage device to the shadow storage device; and restoring at least one section of the storage device image from the shadow storage device to the storage device to restore operating capabilities of the storage device, wherein making the storage device invisible further includes blocking out detection of one of a plurality of storage interfacing architecture connections to make the shadow storage device invisible to the BIOS, and reserving the one of the plurality of storage interfacing connections that is blocked from detection for the shadow storage device.

24. A program code storage device, comprising:

a machine-readable storage medium; and machine-readable program code, stored on a machine-readable storage medium, the machine-readable program code having instructions to make a shadow storage device invisible to a BIOS in a computing device, copy a storage device image from the storage device to the shadow storage device, and restore at least one section of the storage device image from the shadow storage device to the storage device to restore operation capabilities of the storage device, wherein the machine-readable program code further includes instructions to block out detection of one of a plurality of storage interfacing architecture connections to make the shadow storage device invisible to the BIOS, and reserve the one of the plurality of storage interfacing connections that is blocked from detection for use by the shadow storage device.

25. The program code storage device of claim 24, wherein the machine-readable program code further includes instructions to utilize at least one of a compression module and storage archiving module to copy a storage device image from the storage device to the shadow storage device.

26. The program code storage device of claim 25, wherein the machine-readable program code further includes instructions to utilize at least one of a decompression module and storage archiving module to restore at least one section of the storage device image from the shadow storage device to restore operational capabilities of the storage device.

27. The program code storage device of claim 26, wherein the storage device image includes a working bootstrap loader, operating systems files and folders, and operating system driver folders.

\* \* \* \* \*